(12) United States Patent
Sivaraman et al.

(10) Patent No.: US 9,792,343 B2
(45) Date of Patent: Oct. 17, 2017

(54) METHOD, DEVICE AND SYSTEM FOR SYNCHRONIZING OF DATA PROVIDING FOR THE HANDLING OF AN INTERRUPTED SYNCHRONIZATION PROCESS

(75) Inventors: Ganesh Sivaraman, Espoo (FI); Riku Mettälä, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 10/291,192

(22) Filed: Nov. 8, 2002

(65) Prior Publication Data
US 2004/0205263 A1 Oct. 14, 2004

Related U.S. Application Data

(63) Continuation-in-part of application No. 10/236,010, filed on Sep. 3, 2002, now abandoned.

(51) Int. Cl.
*G06F 17/00* (2006.01)
*G06F 7/00* (2006.01)
(Continued)

(52) U.S. Cl.
CPC ........ *G06F 17/30578* (2013.01); *G06F 9/542* (2013.01); *G06F 17/30575* (2013.01);
(Continued)

(58) Field of Classification Search
CPC ....... G06F 17/30575; G06F 9/542; H04L 9/12
(Continued)

(56) References Cited

U.S. PATENT DOCUMENTS 5,684,990 A 11/1997 Boothby
6,247,135 B1 * 6/2001 Feague .......................... 713/400
(Continued)

FOREIGN PATENT DOCUMENTS

| EP | 1 227 396 A | 7/2002 |
|----|----|----|
| JP | 4829316 B2 | 12/2011 |
| WO | 0029998 | 5/2000 |

OTHER PUBLICATIONS

SyncML intensive, http://www-128.ibm.com/develpersworks/xml/library/wi-syncml2/ Apr. 1, 2002.*
(Continued)

*Primary Examiner* — Kyung H Shin
(74) *Attorney, Agent, or Firm* — Alston & Bird LLP

(57) ABSTRACT

The present invention provides a method, a network device and a system for allowing for resuming a preceding incomplete synchronization session is provided, wherein the preceding incomplete synchronization session has been interrupted during its performing. In principle the resuming of the preceding incomplete synchronization session is based on the following operations according to the inventive concept. A communication connection for synchronization of data between a first and a second device is establishing. The first and the second device comprise each a predefined set of data records to be synchronized. A first and a second update identifier are communicated between the first and the second device. The first update identifier specifies a preceding complete synchronization session having been performed between them and the second update identifier specifies a preceding incomplete synchronization session having been performed between them. Synchronization related information is exchanged between the first and the second device. The herein exchanged synchronization related information comprises that part of synchronization related information which has not been exchanged during the preceding incomplete synchronization session. Data in the first device and the second device is synchronized in accordance with the exchanged synchronization related information. The contents of the first update identifier is updated with the contents of the second update identifier.

36 Claims, 7 Drawing Sheets

(51) Int. Cl.
    *G06F 17/30*     (2006.01)
    *G06F 9/54*     (2006.01)
    *H04L 9/12*     (2006.01)
    *H04L 29/08*     (2006.01)
    *H04W 4/00*     (2009.01)
    *H04W 12/06*     (2009.01)

(52) U.S. Cl.
    CPC ............ *H04L 9/12* (2013.01); *H04L 67/1095* (2013.01); *H04W 4/001* (2013.01); *H04L 2209/80* (2013.01); *H04W 12/06* (2013.01)

(58) Field of Classification Search
    USPC .......... 709/248, 227; 710/21; 707/201, 202, 707/613
    See application file for complete search history.

(56) References Cited

U.S. PATENT DOCUMENTS

| | | | |
|---|---|---|---|
| 6,477,545 B1 | 11/2002 | LaRue | |
| 6,516,314 B1 | 2/2003 | Birkler et al. | |
| 6,535,892 B1 | 3/2003 | LaRue et al. | |
| 6,549,917 B1 * | 4/2003 | Pollard et al. | |
| 6,810,405 B1 * | 10/2004 | LaRue et al. | 707/613 |
| 6,820,204 B1 * | 11/2004 | Desai et al. | 726/6 |
| 6,829,655 B1 * | 12/2004 | Huang et al. | 709/248 |
| 6,941,326 B2 * | 9/2005 | Kadyk | G06F 9/542 |
| 7,007,003 B1 * | 2/2006 | Rybicki | 707/613 |
| 7,072,911 B1 * | 7/2006 | Doman | G06F 17/30575 707/615 |
| 2003/0159136 A1 | 8/2003 | Huang et al. | |
| 2003/0194999 A1 * | 10/2003 | Quick, Jr. | H04L 9/12 455/435.1 |
| 2004/0044799 A1 | 3/2004 | Sivaraman et al. | |

OTHER PUBLICATIONS

SyncML Meta-Information DTD, Version 1.0 Dec. 7, 2000, 15 pages.*
EP 1 227 396 A (Microsoft Corporation) Jul. 31, 2002 => U.S. Pat. No. 6,941,326 (Kadyl et al. FD: Jan. 24, 2001).*
Fred Halsall: "Data communications, computer networks, and open systems, 3rd ed." 1992, Addison-Wesley Publishers, USA, XP002383620 ISBN: 0-201-56506-4, p. 567-p. 570.
SyncML Consortium: "SyncML Sync Protocol, version 1.0" SyncML Consortium, Dec. 7, 2000 (Dec. 7, 2000), XP002217356, p. 10-p. 50.
Balasubramaniam S et al: "What is a File Synchronizer?" Mobicom '98, Proceedings of the 4th Annual ACM/IEEE International Conference on Mobile Computing and Networking Dallas, TX, Oct. 25-30, 1998, Annual ACM/IEEE International Conference on Mobile Computing and Networking, New York, NY: ACM, US, Oct. 25, 1998 (Oct. 25, 1998), pp. 98-108, XP000850260, ISBN: 1-58113-035-X, p. 107.
Robert k. Lockhart, et al. "Specifications for Ir Mobile Communications" Specifications for Ir Mobile Communications (IRMC) Mar. 1, 1999 (Mar. 1, 1999), XP002155443 * p. 29-p. 32 *.
Communication from Malaysian Patent Application No. PI20071088, dated Jul. 31, 2012.
Barjaktarovic, M., et al.; "Formal specification and verification of OSI session layer protocol using CCS;" Proceedings of the 36th Midwest Symposium on Circuits and Systems, 1993; pp. 1140-1143; dated Aug. 1993.
"DS Protocol—Approved Version 1.2.1;" Open Mobile Alliance (OMA-TS-DS_Protocol-V1_2_1-20070810-A); dated Aug. 10, 2007.
Extended European Search Report for Application No. 07106795.3; dated Aug. 2, 2007.
Office Action for Canadian Application No. 2,497,525; dated Nov. 19, 2012.
Office Action for Canadian Application No. 2,497,525; dated Aug. 27, 2013.
Office Action for Canadian Application No. 2,497,525 dated Aug. 25, 2014.
SyncML Sync Protocol, version 1.1, Ericsson, IBM, Lotus, Matsushita Communications Industrial, Ltd. et al. (Feb. 15, 2002) 62 pages.
International Search Report for International Patent Application No. PCT/IB03/03737 dated Mar. 31, 2004, 1 page.
Supplementary European Search Report for European Patent Application No. 03793961.8 dated Jun. 16, 2006, 3 pages.
Office Action for European Patent Application No. 03793961.8 dated Oct. 17, 2006, 6 pages.
Office Action for European Patent Application No. 07106795.3 dated Mar. 3, 2008, 1 page.
European Search Report for European Patent Application No. 08104710.2 dated Sep. 12, 2008, 6 pages.
Office Action for European Patent Application No. 08104710.2 dated May 13, 2009, 1 page.
Office Action for European Patent Application No. 03793961.8 dated Jul. 20, 2011, 3 pages.
Office Action for U.S. Appl. No. 10/236,010 dated Dec. 14, 2005, 19 pages.
International Preliminary Examination Report from International Patent Application No. PCT/IB03/03737 dated Aug. 31, 2004, 3 pages.
Office Action for European Patent Application No. 08104710.2 dated May 9, 2017, 9 pages.

* cited by examiner

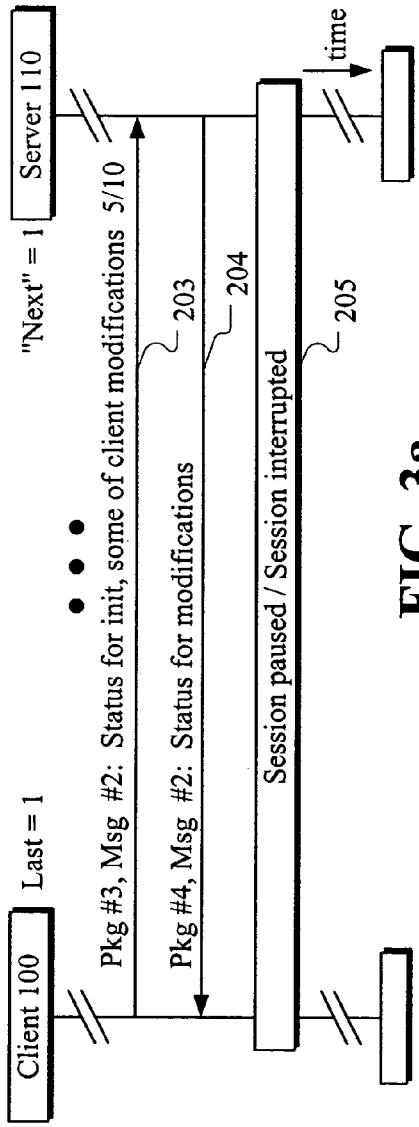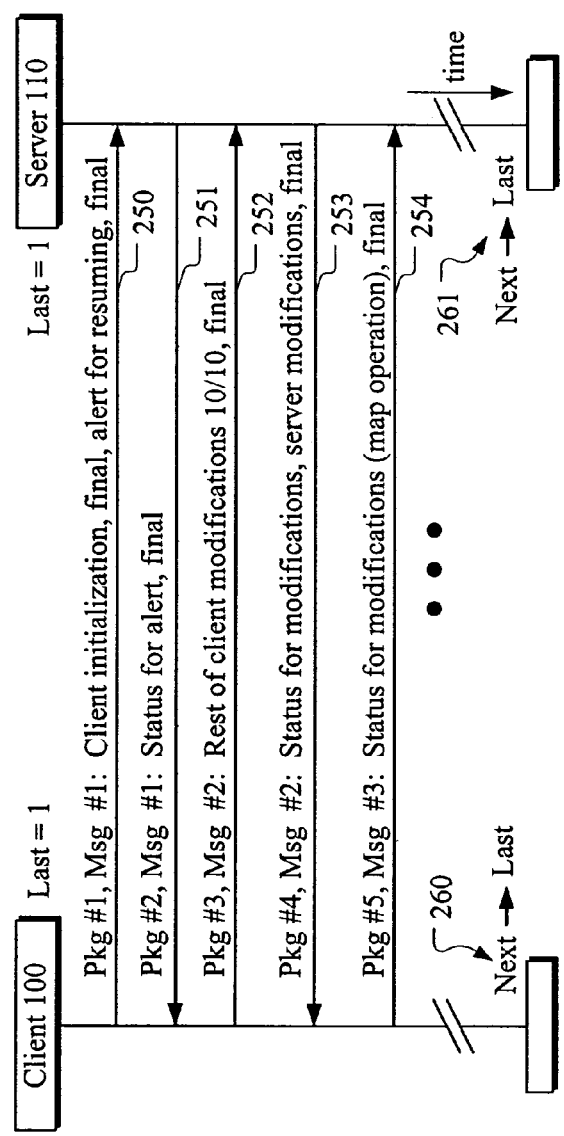

```
 1: <?xml version="1.0" encoding="UTF-8"?>
 2: <SyncML xmlns='SYNCML:SYNCML1.1'>
 3:   <SyncHdr>
 4:     <VerDTD>1.1</VerDTD>
 5:     <VerProto>SyncML/1.1</VerProto>
 6:     <SessionID>78</SessionID>
 7:     <MsgID>2</MsgID>
 8:     ...
 9:   </SyncHdr>
10:   <SyncBody>
11:     <Status>
12:       <CmdId>1</CmdID>
13:       <MsgRef>2</MsgRef>
14:       <CmdRef>0</CmdRef>
15:       <Cmd>SyncHdr</Cmd>
16:       <TargetRef>IMEI:004400061769830</TargetRef>
17:       <SourceRef>http://syncserver.sync.com/servlets/
           SyncML</SourceRef>
18:       <Data>200</Data>
19:     </Status>
20:     <Status>
21:       ...
22:     </Status>
23:     <Sync>
24:       <CmdID>3</CmdID>
25:       <Target>
26:         <LocURI>./Contact/Contacts</LocURI>
27:       </Target>
28:       <Source>
29:         <LocURI>./C\System\Data\Contacts.cdb</LocURI>
30:       </Source>
31:       <Meta>
32:         <Mem xmlns='syncml:metinf'>
33:           <FreeMem>6162632</FreeMem>
34:           <FreeID>48145</FreeID>
35:         </Mem>
36:       </Meta>
37:       <Add>
38:         <CmdID>4</CmdID>
39:         <Meta>
40:           <Type xmlns='syncml:metinf'>text/
             x-vcard</Type>
41:         </Meta>
42:         <Item>
43:           <Source>
44:             <LocURI>108</LocURI>
45:           </Source>
46:           <Data> BEGIN:VCARD, VERSION:2.1,
                 REV:20020517T095324z,
                 N:Club Nokia Careline;;;;,ORG:
                 English;, TEL;VOICE;CELL:+35,
                 URL;WORK:http://
                 www.club.nokia.com,
                 END:VCARD
47:           </Data>
48:         </Item>
49:       </Add>
50:       ...
51:       </Add>
52:     <Sync>
53:   <Final/>
54:   </SyncBody>
55: <SyncML>
```

FIG. 4

METHOD, DEVICE AND SYSTEM FOR SYNCHRONIZING OF DATA PROVIDING FOR THE HANDLING OF AN INTERRUPTED SYNCHRONIZATION PROCESS

CROSS-REFERENCE TO RELATED APPLICATIONS

This application is a continuation-in-part of application Ser. No. 10/236,010 filed Sep. 3, 2002, the entire contents of which are incorporated herein by reference.

BACKGROUND OF THE INVENTION

1. Field of the Invention

The present invention relates to a method and a device, respectively, for synchronizing of data between a synchronizing client device and a synchronizing server device and further to the respective synchronizing devices. More particular, the present invention relates to a method and a device for synchronizing of data, respectively, allowing for improved handling of an interruption of an active synchronization process.

2. Description of Related Art

The synchronization of data is a well known concept or technique for users, respectively, having at least two different electronic devices in use and processing the same kind of data with these electronic devices. In general, synchronization takes place between a terminal device (e.g., a mobile phone) and a server device (e.g., an application in a local PC or a dedicated synchronization server). Data from terminals, such as portable computers, PDA terminals (personal digital assistant), mobile phones, mobile stations or pagers, can be synchronized with networked devices acting as synchronization servers being represented by networked applications, applications of desktop computers or with other managing applications of data stores of telecommunications systems, wherein the term "data store" should be understood as broad as possible, i.e. shall cover arbitrary sets of data. In particular data of a calendar, data of contacts, data of e-mail applications as well as data relating to device/application settings and configurations are typically synchronized.

Synchronization has been based on the use of different manufacturer-specific protocols which are incompatible. This restricts the use of terminal or data types and often causes troubles to the user. In mobile communication, in particular, it is important that data can be retrieved and updated regardless of the terminal and application used.

To improve synchronization of application data, a language known and referred to as synchronization markup language SyncML has been designed, which is based on the extensible markup language (XML). By using a SyncML synchronization protocol, which employs messages in the SyncML format, data of any application can be synchronized between networked terminals and a network server of any kind. The SyncML synchronization protocol works both in wireless and in fixed networks and supports several transmission protocols. The above presented SyncML synchronization technology addresses in particular the synchronization of data stores or databases, respectively.

Conventionally, a synchronization of data records is performed at a distinct point in time in order to harmonize, i.e. to bring into correspondence, two distinct predefined sets of data records stored at different storage places, i.e. at different synchronizing devices managing and employing the storage places, resulting in two equivalent sets of data records at both storage places at this distinct point in time. The synchronization of data records performed at a distinct point in time is further designated as a synchronization session. The synchronization of the sets of data records is obtained during such a synchronization session by exchanging information, instructions and commands allowing both participating synchronizing devices for modifying their stored sets of data records resulting in a harmonization of them, wherein such modification operations comprises adding of data, removing of data, appending data to current data, updating of data and the like. The exchange of required information and commands is for practical purposes carried out by communicating between the synchronizing devices one or more messages each containing a distinct subset of the total required information, instructions and commands necessary to perform the harmonizing at each synchronizing devices. Moreover, each of the one or more messages is acknowledged in order to indicate successful operation in accordance with its message information contained therein.

Basically, synchronization processes as described above can be handled and performed in either a full synchronization process also designated as slow synchronization or an incremental synchronization process also designated as normal or fast synchronization, respectively. During a synchronization session performing a full or slow synchronization process, respectively, all predefined sets of data records in both participating synchronizing devices are harmonized. During a synchronization session performing an incremental or fast synchronization process, respectively, a point in time of the last completed synchronization session is logged in both participating synchronizing devices and in case the logged point in time stored in both synchronizing devices matches only data records being modified since this logged point in time are selected for synchronization all other are excluded from the synchronization process. Therefore, a change log may be maintained by the synchronizing devices logging the modification, adding or deleting point of time of data records. Alternatively, the modifications may be determined in another manner such as investigating the modification time stamps of the records, if such exist. Both synchronization processes, i.e. the so-called slow and the so-called fast (normal) synchronization are defined and used in the SyncML standard. Further types of synchronization processes are available and used but these further synchronization processes can be reduced to the aforementioned basic synchronization processes.

When a record and/or a group of records has been synchronized with the other database, an acknowledgement is sent back to the sender of the record. Two fundamental ways for handling the acknowledgements can be implemented in synchronization applications. In the first implementation each successful synchronization of a data record or a batch of data records is acknowledged and logged by the synchronizing devices preferably in such one or more change logs. In the second implementation the acknowledgements are handled at the end of a synchronization session, i.e. as soon as both synchronizing devices indicate a proper closing of the synchronization session and the corresponding employed communication connected. Further, the handling of the acknowledgements at the end of a synchronization session and the updating of a point in time specifying the last completed synchronization session is operated substantially at the same time. In case the synchronization session is carried out in the way of a slow synchronization process taking into account the point in time specifying the last completed synchronization session is obviously not required.

The first implementation primarily addresses synchronization applications used for synchronizing for example distributed databases with high-speed connection to each other in order to maintain and ensure data integrity. In such implementations, the capacity requirements of storing and maintaining change logs for each data record, the requirement of processing capability for processing the change logs as well as the requirement of network bandwidth for exchanging necessary acknowledgements are of minor importance. In view of synchronizing data stored in small electronic device such as mobile phones, handhelds, personal digital assistants, communicators and the like the storage capacity and processing power are limited such that storing, maintaining and processing of change logs for each data record is cumbersome, inefficient and sometimes not even possible. Moreover, the network traffic resulting from the required acknowledgements is not acceptable as it is also expensive and time-intensive in mobile communication environments.

The second implementation, wherein the updating of time stamps and handling the acknowledgements for the item is carried out at the end of the session, is suitable for use in small electronic devices and supported by the SyncML standard. Nevertheless, this implementation raises the problem that an interruption of a currently performed synchronization session is not provided for. The maintaining of the synchronization information exchanged during a partially operated synchronization session is not possible since, the updating of the time stamps (synchronization anchors) and the handling of the acknowledgements at the end of the synchronization session is not achieved due to the interruption. Even if the acknowledgements of data items are handled during the session, since the time stamps are updated only at the end of the session, interruption of a slow synchronization leads to loss of the already processed synchronization information. In both the above cases the synchronization session has to be repeated completely in order to ensure data integrity. Depending on the amount of synchronization related information, i.e. depending on the number of data records to be synchronized, an even huge number of messages are exchanged during a single synchronization session normally comprising several synchronization messages. For example 400 data records of 500 data records may have been synchronized during a synchronization session and an interruption occurs. In the following synchronization session all of the 500 data records have to synchronized again independent of whether the synchronization is operated as either a fast or a slow synchronization process.

SUMMARY OF THE INVENTION

The object of the invention is to provide a method allowing for resuming an interrupted synchronization session in order to avoid a complete repetition of the interrupted synchronization session. The provision for resuming an interrupted synchronization session is constructed such that neither high storage capacities, high processing power, high number of interchanged acknowledgements nor high communication bandwidth are required. The method is suitable to be implemented in a small electronic device in an economic way.

According to an embodiment of the invention, a method allowing for resuming a preceding incomplete synchronization session is provided, wherein the preceding incomplete synchronization session has been interrupted during its operation. The resuming of the preceding incomplete synchronization session is achieved by the following operations.

A communication connection for synchronization of data between a first device and a second device is established. The first device and a second device comprise each a set of data records to be synchronized. Conventionally, data records are organized in a data storage or a database maintained by a corresponding application.

In one embodiment, the present invention provides a method for resuming an interruption of a previous incomplete synchronization session related to an exchange of data between two devices. The method features the step of sending from the first device to the second device an alert for resuming signal containing information related to a request for the resumption of the previous incomplete synchronization session. The alert for resuming signal may at least be a direct alert code or the like directly indicating a resume session or a signal that is deductable by the server, e.g., indication of the time stamps to be used in the session or some other identification of the session. The method also features the step of sending from the second device to the first device a status for the alert signal indicative of information related to a sync type to be carried out. The information related to the status of the alert for resume signal may include information for overriding an earlier sync type of the previous incomplete synchronization session.

In an alternative embodiment of the present invention, a first update identifier and a second identifier are communicated either from the first device to the second device or from the second device to the first device. The direction of transmission depends on what device indicates the resuming of the preceding incomplete synchronization session and the direction of the synchronization. The indicating device transmits both identifiers to the other one. The first update identifier specifies a preceding complete synchronization session having been performed between the first device and the second device. The first update identifier has been stored in the first device and the second device during an initialization of the preceding complete synchronization session. More specifically, the value of the identifier is stored, but the name or storage place of the value may vary according to the implementation. Commonly, the first update identifier is a time stamp used for logging the initiation time of the preceding complete synchronization session. Alternatively, the identifier can be any numerical value, for example a monotonically increasing numeric integer string, a text string, or a mixture of these, created in an orderly fashion or at least to some degree or part randomly. According to the invention, the second update identifier specifies a preceding incomplete synchronization session having been performed between the first device and the second device. The second update identifier has been stored in the first device and the second device during an initialization of the preceding incomplete synchronization session. Commonly, the second update identifier is analogously also a time stamp or such used for indicating the initiation time of the preceding synchronization session that was interrupted. However, in the prior art, the behavior and use of the second update identifier is defined only during a synchronization session, but not after an interruption or a completion of a session.

The method according to the present method has four steps for synchronizing. A first step includes establishing a communication connection for synchronization of data between a first device and a second device each comprising a set of data to be synchronized. A second step includes transmitting a first update identifier and a second update identifier, the first update identifier denoting a preceding complete synchronization event having been performed between the first device and the second device, a value of the first update identifier having been stored at least in the first device, the second update identifier denoting a preceding incomplete synchronization event having been started between the first device and the second device, a value of the second update identifier having been stored at least in the first device. A third step includes retrieving or forming an indication of data that has been successfully synchronized during the preceding incomplete synchronization event. The first step includes using the indication, synchronizing data that has not been successfully synchronized during the preceding incomplete synchronization event; and (4) at least in the first device, updating the value of the first update identifier with said value of the second update identifier.

The method may also include a step of transmitting additional information relating to the preceding incomplete synchronization event and comprising at least one information out of a group comprising information about the preceding incomplete synchronization, and information about data successfully synchronized in accordance with received synchronization related information.

The method may also include a step that is performed in at least one of the first device and the second device of comparing, in a first comparison, a value of the first update identifier transmitted from the first device with a value of the second update identifier of the first device stored in the second device; and of comparing, in a second comparison, a value of the second update identifier transmitted from the first device with a value of the second update identifier of the first device stored in the second device, as well as carrying out at least one of the following options:

1) In case the second comparison yields a value of true, a further step of synchronizing data between the first device and the second device, the data comprising data that has not been exchanged during the preceding incomplete synchronization event.

2) In case the second comparison yields a value of false, synchronizing data between the first device and the second device, the data comprising at least data that has been synchronized during the preceding incomplete synchronization event.

3) In case the first comparison yields a value of false, a further step of synchronizing data between the first device and the second device, the data comprising data that has been synchronized during the preceding complete synchronization event.

4) In case the first comparison yields a value of true, a further step of synchronizing data between the first device and the second device, the data that has not been synchronized during the preceding complete synchronization event.

The step of establishing a communication connection for synchronization may include transmitting an initial message instructing at least one of the first device and the second device to prepare for resuming the preceding incomplete synchronization.

The synchronization may be based on a synchronization protocol in accordance with the SyncML standard, the first update identifier being a LAST synchronization anchor. The second update identifier may be at least one of a NEXT synchronization anchor and a PAUSE synchronization anchor. Moreover, the additional information relating to the preceding incomplete synchronization event may include at least one information out of a group of a synchronization event session identifier (session ID), a synchronization message identifier (message ID), and one or more identifiers of acknowledged data and their respective data store. Moreover still, the additional information has been stored at least in the first device before transmitting the first and second update identifiers.

In the method, data has been successfully synchronized if the acknowledgement for the data or the message containing the data has been successfully received, and the acknowledgement indicates either a positive or a negative status of the synchronization of the data or the message.

The invention also provides a software tool for synchronizing, comprising program portions for carrying out the steps of the aforementioned method, wherein the software tool is for being implemented in a computer program for being executed on a processing device, a terminal device, a communication terminal device or a network device, as well as a computer program or computer program product for synchronizing the same.

The invention also provides a device for use in a network and capable of synchronizing data having a storage medium, a communication interface, a retrieving or a forming component and an updating component. The storage medium has predefined sets of data to be synchronized. The communication interface establishes a communication connection for synchronization of data to another device for use in a network, for communicating a first update identifier and a second update identifier with the other network device and for exchanging data with the other network device. The first update identifier denotes a preceding complete synchronization event having been performed with the other network device, the first update identifier having been stored at least in the network device. The second update identifier denotes a preceding incomplete synchronization event, the second update identifier having been stored at least in the network device, wherein the data comprises at least data that has not been synchronized during the preceding incomplete synchronization event. The retrieving or a forming component retrieves or forms an indication of data that has been synchronized during the preceding incomplete synchronization event, the indication having been stored in the network device. The synchronizing component synchronizes data in accordance with the indication. The updating component updates contents of the first update identifier stored with contents of the second update identifier stored.

The communication interface may be adapted for transmitting supplementary additional information relating to the preceding incomplete synchronization event. The additional information may include at least one information out of a group comprising information about the preceding incomplete synchronization, information about a last successful exchange of synchronization related information and information about data successfully synchronized in accordance with received synchronization related information.

The device may also include a component for comparing, such that, in a first comparison a value of the first update identifier transmitted from the device with a value of the second update identifier of the device stored in the other device, and, in a second comparison, a value of the second update identifier transmitted from the first device with a value of the second update identifier of the device stored in the other device. The component for carrying out at least one of the aforementioned options discussed above in relation to the method.

The invention also provides a system for synchronizing, comprising a first network device and a second network device, wherein each device includes elements for performing steps similar to that discussed above in relation to the overall method and device of the invention.

BRIEF DESCRIPTION OF THE DRAWINGS

It invention will be described in greater detail by means of embodiments with reference to the accompanying drawings, in which

FIG. 3a shows a chronological sequence diagram of a synchronization process analogously to FIG. 2 and being interrupted or stopped according to an embodiment of the invention;

FIG. 3b shows a chronological sequence diagram of a synchronization process resuming the interrupted or stopped synchronization process of FIG. 3a according to an embodiment of the invention;

FIG. 4 shows an excerpt of a XML-coded synchronization message in accordance with the synchronization process illustrated in FIG. 3b and according to an embodiment of the invention;

DETAILED DESCRIPTION OF THE INVENTION

Figure 1:
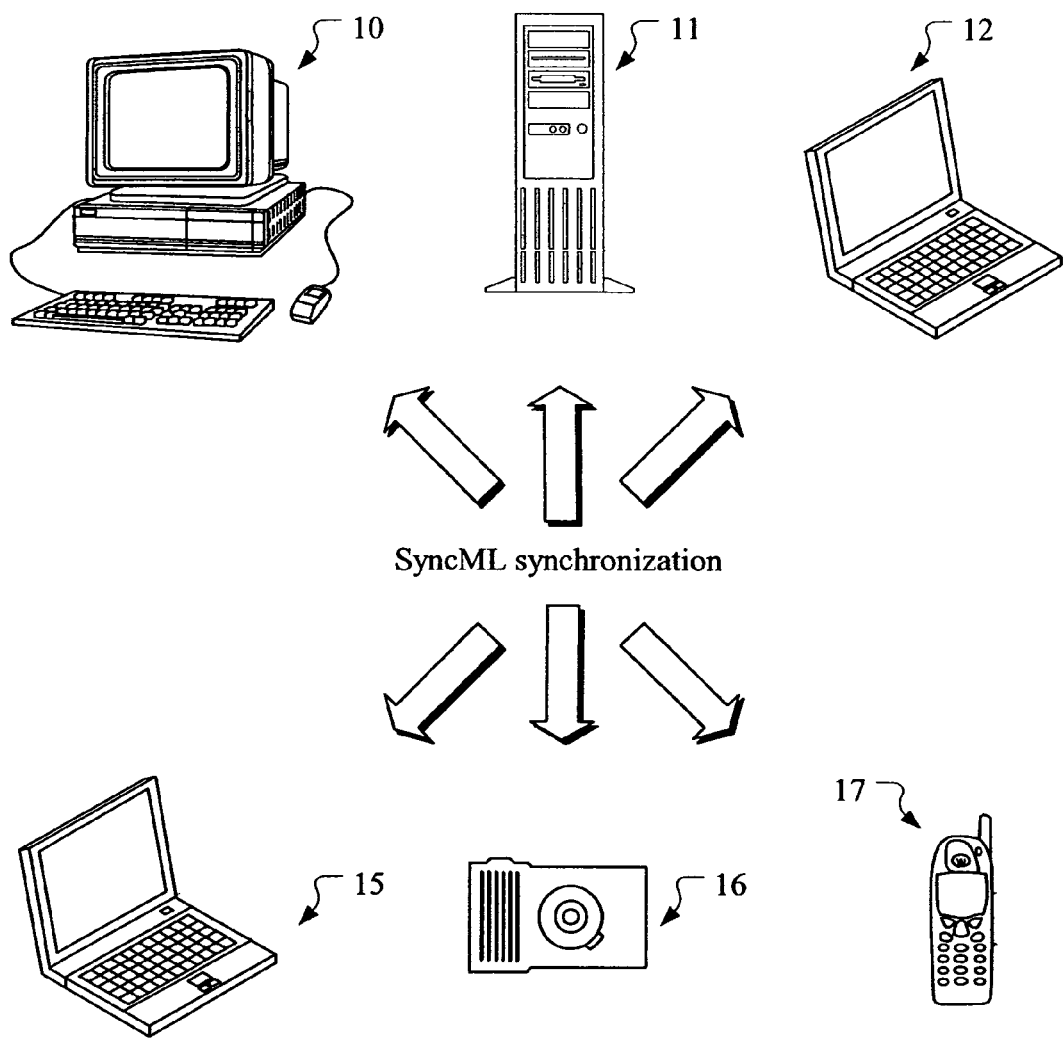
FIG. 1 shows a schematic diagram illustrating a set of exemplary electronic devices between which synchronization of information is operable.

In the following, the embodiments of the invention will be described in the view of a system supporting the SyncML synchronization standard without limiting the invention thereto. Information relating to the SyncML standard can be obtained from the SyncML Initiative providing publicly the full standard documentation. Same or equal parts, components and/or operations shown in the figures will be referred to using the same reference numerals.

FIG. 1 shows a schematic diagram illustrating a set of exemplary electronic devices between which synchronization of information is operable. A certain data store content of for example a mobile terminal shall be harmonized with data store content provided by designated devices for example offering a central storage of this data store content to be accessible by means of several different mobile and/or stationary terminals. Conventionally, mobile terminals act as synchronization clients harmonizing or synchronizing data relating to certain predefined applications running on these synchronization clients with the contents of a data store or several data stores provided by dedicated server devices centrally storing the application related data. FIG. 1 illustrates a plurality of possible client devices and server devices operable with the synchronization operation. Typically, client devices are mobile stations like mobile phones 17 or personal digital assistants (PDA), mobile computers like notebooks 15, electronic devices storing digital data like digital cameras 16 as well as stationary terminals like desktop computers (PC). Further, dedicated synchronization server devices may be stationary terminals like desktop computers 10, dedicated network servers 11 e.g. operating their synchronization capability as networked synchronization applications or even mobile computers like notebooks 12 e.g. running synchronization server applications. It shall be noted that the client device functionality is not limited to mobile terminals as described above although the presented concept of synchronization is described in view of mobile terminals connected to dedicated serving devices.

A corresponding synchronization process in accordance with the SyncML protocol standard is established via an appropriate logical communication connection. The logical communication connection is provided by any communication networks in combination with transport protocols to which the synchronization protocol is adapted. A suitable communication network may be a local area network (LAN) or a wide area network (WAN) which may comprise the internet and an intranet of a company but also wire-based serial networks such as universal serial bus (USB) or standardized serial communication (e.g. RS-232). The participating synchronization devices may be also connected via a wireless communication network such as a mobile network supporting global system for mobile communication (GSM) services and/or supporting general packet radio services (GPRS), a third generation mobile communication network such as a universal mobile telecommunication system (UMTS) network, a wireless local area network (WLAN), short range radio communication network, such as a Bluetooth network, wireless local loop (WLL) or an infrared network (IrDA). The logical communication connection between the participating synchronization devices may be provided by a single communication network of the aforementioned type but also may be provided by several communication networks of the aforementioned types interconnected by dedicated network routing devices interconnecting communication networks connections and, if necessary, translating between data protocols of the respective employed communication networks.

With respect to the SyncML protocol standard, the SyncML synchronization protocol, and hence also with respect to the SyncML device management protocol standard, the SyncML device management protocol is implemented on the top of appropriate protocols in accordance with the type of employed communication network. Appropriate protocols on which top the SyncML synchronization protocol can be implemented are the hyper text transfer protocol (HTTP), the wireless session protocol (WSP) of the wireless application protocol (WAP) standard, the object exchange protocol (OBEX) used for cable connections, such as universal serial bus (USB) or RS-232, for short-range radio frequency connections (Bluetooth) or for infrared connections (IrDA), the transport control protocol/internet protocol (TCP/IP) stack and on top of the transport layer service which is offered by the e-mail protocol (e.g. simple mail transfer protocol, SMTP).

Transfer at the lower layer can be performed according to the underlying network using e.g. short messages SMS (short message service) or other signaling type transmission methods (e.g. USSD; unstructured supplementary service data), circuit-switched data calls, packet-switched data transfer services as well as paging message service, messages provided via cell broadcast and the like.

In the following the term data store shall be understood as broad as possible, i.e. shall cover arbitrary set(s) of data provided by data storage(s) to be accessed. In particular, the sets of data relate to specific applications and may be organized to meet application specific requirements such as data of calendar applications, directory applications, contact applications (e.g. vcard applications), e-mail applications and the like. Further, the arbitrary set(s) of data can be organized in one or more databases including data records providing data to be accessed. Further the term data store shall be understood as covering network data services or networked service(s), respectively, i.e. as covering arbitrary set(s) of data provided by networked service(s) to be accessed similar to data store(s). Conventionally, networks services are based on data stores having a specific service related data store content.

The following sequence diagrams depict operational sequences according to embodiments of the methods of the present invention. The depicted sequences of operations are just illustrative and not limiting thereto. Further realizations based on similar or related operational sequences are also possible.

Figure 2:
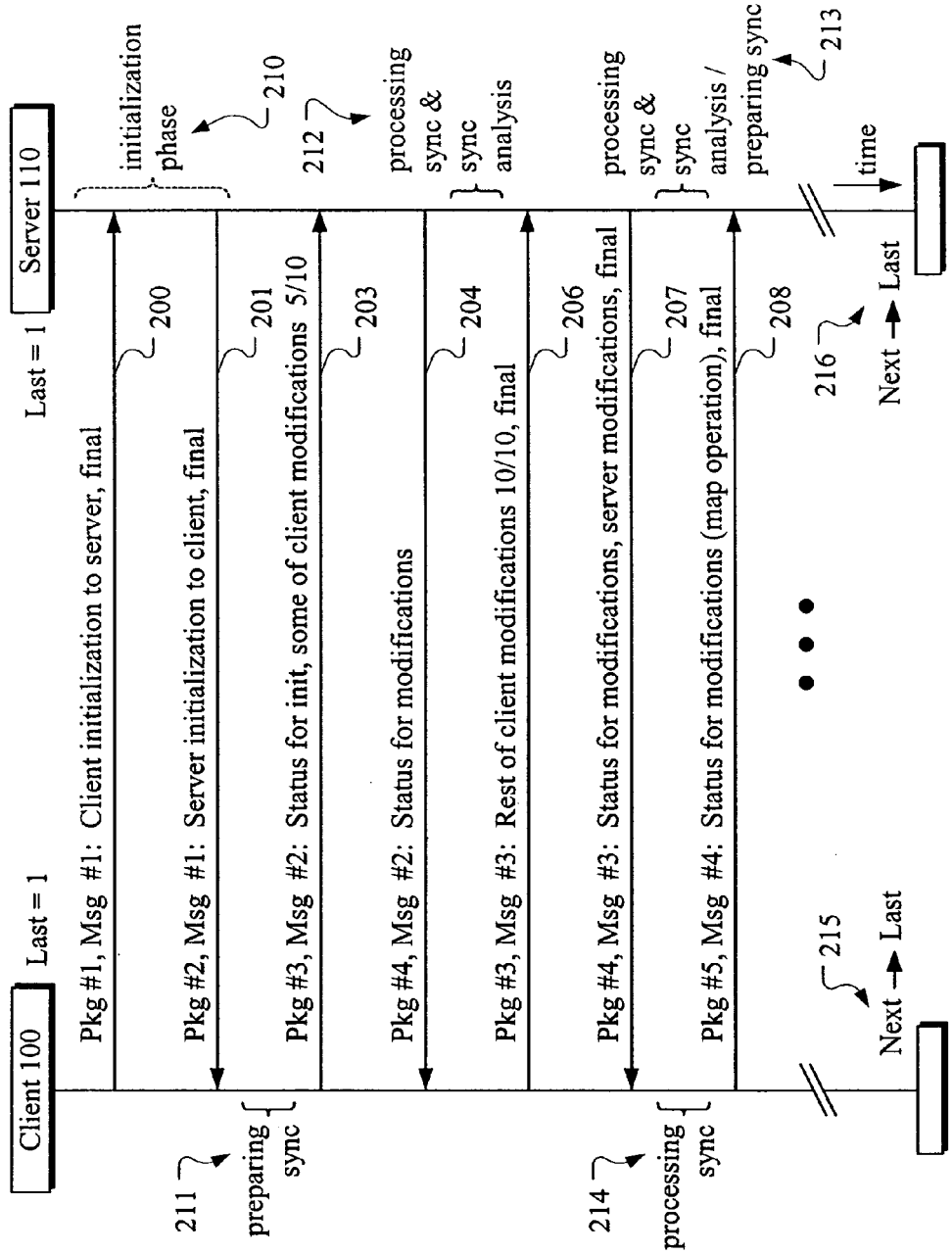
FIG. 2 shows a chronological sequence diagram of a synchronization process comprising several messages exchanged between a synchronizing client device and a synchronizing server device according to an embodiment of the invention.

FIG. 2 shows a chronological sequence diagram of a synchronization process comprising several messages exchanged between a synchronizing client device and a synchronizing server device according to an embodiment of the invention.

SyncML synchronization session are conceptually bounded into so called SyncML packages. The SyncML packages is simply a conceptual framework for one or more SyncML messages that are physically exchanged between the synchronizing devices and that are required to convey a set of synchronization information and commands. Not all SyncML packages are involved in any of the types of synchronization provided by the SyncML standard. The exact number of the SyncML messages depends on the amount of information to be conveyed.

A coarse overview of the SyncML packages is described in the following list. A detailed description can be obtained from the SyncML standard documents.

Package 0—initiation of the synchronization message. A client device can receive unsolicited messages, so-called "notifications" or "alerts", instructing to cause the receiving device to establish a back connecting for initiating a synchronization session. Note that an identical effect to receiving a notification can be caused in other ways.

Package 1—initialization from client device to server device. One or more initialization messages are transmitted for example comprising: client device information (device identifier etc.), client device properties, client authentication, type of synchronization, identifications of databases of which data records are to be synchronized, stored LAST anchor, new NEXT anchor, etc.

Package 2—initialization from server device to client device. One or more initialization messages are transmitted for example comprising: server device information (device identifier etc.), server device properties, server authentication, response and status information about information comprised in one or more client initialization messages.

Packages 1 and 2 are part of the initialization phase. The following packages 3 to 6 are part of the synchronization phase of the synchronization message.

Package 3—Client to server synchronization. One or more client synchronization messages are transmitted for example comprising: client data modifications, i.e. any changes to the data of the client databases identified in the synchronization initialization, etc. In the case of a fast synchronization process, only data records that have been modified since the previous synchronization session (LAST anchor) are reported, in the case of a slow synchronization process all data records are reported.

Package 4—Server to client synchronization. One or more server synchronization messages are transmitted for example comprising: information about the server's analysis of transmitted client data modifications, and also server data modifications, i.e. any changes to the data of the server databases identified in the synchronization initialization, etc. In the case of a fast synchronization process, only data records that have been modified since the previous synchronization session (LAST anchor) are reported, in the case of a slow synchronization process all data records are reported.

Package 5—Data update status, map operation. One or more data update status messages are transmitted for example comprising information about the results of data update (synchronization due to server modifications), map operations (table) for mapping local unique identifier (LUID) and global unique identifier (GUID), etc. A local unique identifier is an identifier assigned to a data record and being locally unique on the client side, i.e. per device and application. The local unique identifier allows for identifying a data record. A global unique identifier is an identifier assigned to a data record and being locally unique on the server side.

Package 6—Map acknowledgement. One or more map acknowledgement messages are transmitted for example comprising acknowledgements informing the client device of receiving one or more data update status messages by the server, etc.

A client message in accordance with package 3 may cause a server response message in accordance with package 4 and vice verse depending on the synchronization information and commands contained in the client message or the server message, respectively.

Each message of a synchronization message contains a session identifier (session ID) such that the messages can be associated to a distinct synchronization session. Each message contains a message identifier (message ID) such that misalignments of exchanged messages at the client device and at the server device is prevented, respectively. Further, each last message of each package type contains a final indicator to indicate that this is the last one.

The synchronization process is further distinguished by what kind of information (which data records) is to be synchronized (a slow or a fast synchronization, i.e. total number of data records or only modifications since a distinct point in time), in which device(s) (in either the client device or the server device or in both devices) synchronization is performed and from which device synchronization is initiated. The type of synchronization can be e.g. two-way sync, slow sync, one-way sync from client only, refresh sync from client only, one-way sync from server only, refresh sync from server only and server alerted sync.

The designations of the enumerated types of synchronization itself describe the synchronization process and are easily understandable. A more detailed description reference is made to the SyncML standard documentation.

By way of example, the chronological sequence diagram and the synchronization process shown in FIG. 2 are based on a fast two-way synchronization type, respectively, although the scope of the invention is intended to include other synchronization types. A client 100 synchronizes with the server 110. In accordance with the above description of the package sequence, the depicted synchronization session consists of an initialization phase 210 followed by the synchronization phase each comprising several synchronization messages. All synchronization messages contain a same session ID (not depicted).

During the initialization phase 210 of the client 100 and server 110, both devices exchange device information (device identifiers etc.), device properties, device authentication information. The client 100 further defines the type of synchronization (herein fast two-way synchronization type) and reports the LAST anchor stored and a NEXT anchor newly defined to the server 110. The server 110 compares the LAST anchor transmitted by the client 100 with a corresponding value stored in the server 110 and conforms the LAST anchor and the NEXT anchor if the stored and received LAST anchors match to allow for fast synchronizing. The state (content) of the NEXT anchor is undefined (by the prior art, i.e. the prior art two-way synchronization process does not provide any particular value for it) in the server 110 (indicated by the "?" sign) up to the moment the client 100 transmits this newly defined one. If the anchors do not match, slow synchronization is alerted to the client 100. The information exchange during the initialization phase 210 is illustrated by a first operation 200 referring to a client initialization message corresponding to a package 1 message and a second operation 201 referring to a server initialization message corresponding to a package 2 message. Both messages referred to by operations 200 and 201, respectively, contain the same message ID 1.

After completion of the initialization phase 210, the client 100 prepares the synchronization 211, i.e. identifies the data records modified in accordance with the received LAST anchor. A client synchronization message (package 3 message type) referred to by operation 203 contains a first batch of client modifications, herein five modifications of a total of ten identified modifications. It may be noted that client modifications include commands and/or data content. The commands comprise above all an add, update, delete, etc. which are completed with data content to synchronize a respective data record. Additionally, this message further contains status information in accordance with the previous server initialization message. The server 110 receives this first client synchronization message, analyzes the received client modifications, solves possible conflicts emerging from the client modifications and processes the client modifications (operation 212). A corresponding server synchronization message (package 4 message type) referred to by operation 204 is transmitted to the client containing client modification acknowledgements and status information of the analyze and synchronization processing. Both the client synchronization message referred to by operation 203 and the server synchronization message referred to by operation 204 are identifiable by a common message ID, herein message ID 2. It should be noted, however, that the message numbering may deviate from what has been presented above. Indeed, the only purpose to be served by the message numbering is that each device has a consistent view of the message numbers, i.e., the numbering towards the client and the server do not even have to match.

A following client synchronization message (package 3 message type) referred to by an operation 206 contains a second batch of client modifications, herein remaining five modifications of ten total identified modifications. This client synchronization message contains additionally a final indicator indicating that this is the last client synchronization message containing client modifications. The server 110 receives this last client synchronization message, analyzes the received client modifications, solves possible conflicts emerging from the client modifications, processes the client modifications and due to the final indicator prepares (identified under consideration of the server's LAST anchor) server modifications to be transmitted to the client 100 (operation 212). A corresponding server synchronization message (package 4 message type) referred to by an operation 207 is transmitted to the client containing server modifications, client modification acknowledgements and status information of the analyze and synchronization processing. In accordance with the synchronization session depicted in FIG. 2, a single server synchronization message is sufficient for transmitting all identified server modifications to the client such that this message additionally contains a final indicator. In an operation 214 the client 100 processes the received server modifications. Both messages referred to by operations 206 and 207, respectively, contain the same message ID 3.

A client update status message (package 5 message type) referred to by operation 208 is subsequently conveyed to the server 110 containing acknowledge information and synchronization status information due to the server modifications and if necessary map operations to the server 110 processing the data record map table assigning local unique identifiers and global unique identifiers. Finally and not depicted the client update status message may be responded by the server 110 with one or more map acknowledgement messages (package 6 message type).

Conclusively, the synchronization session and the communication connection through which the synchronization messages of this session are communicated are closed. In the case where no error is detected regarding the finalizing of the synchronization session and the communication connection, the content of the NEXT anchor defined at the beginning of the synchronization session stored. This assignment is performed at the client 100 in an operation 215 and at the server in an operation 216 (in fact, the server may not call the anchor LAST, but nevertheless, the value stored to the anchor is the value of the NEXT anchor sent by the client). Thus a following fast synchronization process is possible.

It is noted that the defining of the NEXT anchor at the beginning of a synchronization session and the assigning of the NEXT anchor content to the LAST anchor after a proper finalization of the synchronization session prevent conflicts due to modification of data records on the client side or server side during the synchronization process. It may be additionally remarked that the content of the depicted LAST anchors and NEXT anchors are just to enlighten their usage. For practical purposes the LAST anchors and the NEXT anchors are normally composed of or derived from a date value and a time value, or they are numerical values of other kind. This kind of composing may ensure to generate an unambiguous LAST and NEXT anchors, respectively.

FIG. 3a shows a chronological sequence diagram of a synchronization process analogously to FIG. 2 and being interrupted or stopped according to an embodiment of the invention. The synchronization session depicted in FIG. 3a shall be identical to this one presented with reference to FIG. 2, i.e. the initial conditions, the operations 200-204 and the operations 210-212 are performed in the same way. Correspondingly, the operations depicted in FIG. 3a and the respective operations depicted in FIG. 2 and common with FIG. 3a are referenced by the same reference numerals.

In FIG. 3a the initialization phase and the corresponding initialization messages of the client 100 and the server 110 are omitted. The operation 203 referring to the first client synchronization message (package 3 type) containing the first 5 of 10 client modifications and the operation 204 referring to the first server synchronization message (package 4 message type) is shown containing status information corresponding to the client modifications.

In an operation 205 the synchronization is interrupted or stopped. An interruption or stop can be caused due to several reasons, for example the synchronization session is stopped on user interaction, on user initiative, on power loss of the client 100 or server 110 e.g. due to lack of battery or accumulator capacity, on loss of the communication connection e.g. due to loss of coverage in radio communication networks, due to interference in the communication connections only to present a selection of possible reasons.

In order to allow for resuming the synchronization session according to an embodiment of the inventive method the client 100 and the server 110 log information relating to the incomplete synchronization session. This information allowing for resuming the incomplete synchronization session comprises at least the LAST anchor and NEXT anchor at least in the client 100 which are logged in both the client 100 and the server 110. Further, this information can also comprise a session ID of the incomplete synchronization session, a message ID of the last message properly transmitted and for which the client 100 has received an acknowledgement, and one or more unique data record identifiers, i.e. local unique identifiers or global unique identifiers of data records according to those modifications have being transmitted and transmissions of those have being acknowledged during the incomplete synchronization session.

Alternatively instead of employing the NEXT anchor for logging the point in time at which the incomplete synchronization session has been started a new anchor, e.g. a PAUSE anchor, is defined and employed especially to be used for resuming an incomplete synchronization session. In the following the inventive concept is described with reference to the NEXT anchor but not limiting the inventive concept thereto. To adapt the description following below to such a new PAUSE anchor the term NEXT anchor is simply to be replaced by the term PAUSE anchor.

FIG. 3b shows a chronological sequence diagram of a synchronization session carrying on the interrupted or stopped incomplete synchronization session of FIG. 3a according to an embodiment of the invention.

The resuming synchronization session is initiated by an operation 250 referring to a new initialization message (package 1 type) comprising an alert command indicating the intend of the client 100 to the server 110 so as to resume the previous incomplete synchronization session described above with reference to FIG. 3a. This new initialization message contains at least the LAST anchor and the NEXT anchor which have been logged in accordance with the interruption of the previous incomplete synchronization session (operation 205 in FIG. 3a). The server receives these LAST anchor and the NEXT anchor from the client and compares them with those LAST anchor and the NEXT anchor logged by itself. It shall be noted that in comparison to the synchronization session presented in FIG. 2 and its analogy presented in FIG. 3a the NEXT anchor has a well defined state and content on the server side, respectively.

At least one of the client 100 and/or the server 110 may either command, initiate or carry out any one of the following four different options depending on whether either the LAST anchors match and/or whether the NEXT anchors match, as follows:

1) In case the received and the logged LAST anchors and the received and the logged NEXT anchors match, the server 110 confirms the resuming of the incomplete synchronization session (resuming fast synchronization) by transmitting a server initialization message (package 2 type) referring to operation 251 and containing at least the LAST anchor and NEXT anchor for acknowledgement. The confirmation for allowing for resuming may be based additionally on further information relating to the incomplete synchronization session to be resumed (refer to operation 205 in FIG. 3a). For example, the aforementioned logged session ID of the incomplete synchronization session and/or logged a message ID of the last message properly transmitted are consulted during the examination operation of the logged anchors.

2) In case the received and the logged LAST anchors match but the received and the logged NEXT anchors do not match, a (normal) fast synchronization session in the kind of that presented with reference to FIG. 2 is commanded by the server. The mismatching NEXT anchors prevent the resuming of the incomplete synchronization session described with reference to FIG. 3a.

3) In case the received and the logged LAST anchors do not match but the received and the logged NEXT anchors match, a resuming slow synchronization session is commanded by the server. This resuming slow synchronization session is not depicted in FIG. 3b. In short, the resuming slow synchronization session exchanges synchronization related information which allow to synchronize all data records predefined for being synchronized. But this synchronization related information is excluded from the resuming slow synchronization session which has been successfully exchanged and synchronized during the incomplete synchronization session shown in FIG. 3a.

4) In case both the received and the logged LAST anchors and the received and the logged NEXT anchors do not match, neither a resuming fast synchronization session nor a resuming slow synchronization session can be initiated. Also a fast synchronization is not possible. A complete slow synchronization session (as aforementioned; not shown in FIG. 3b) comprising the exchange of all data records predefined for being synchronized has to be performed in order to establish a proper synchronization state between both participating devices.

The following description is based on the assumption that first case (the received and the logged LAST anchors as well as the received and the logged NEXT anchors match) is correct. This case is also indicated in the FIG. 3b having an illustrating of the state (value) of the logged LAST and NEXT anchors of both the client 100 and the server 110. The server 110 transmits a server initialization message (package 2 type) referring to operation 251 and containing at least the LAST anchor and NEXT anchor for acknowledgement.

As described with respect to operation 205 shown in FIG. 3a further log information relating to the incomplete synchronization session are logged at their interruption. As aforementioned this information may comprise at least one of a session ID of the incomplete synchronization session, a message ID of the last message properly transmitted and one or more unique data record identifiers, i.e. local unique identifiers or global unique identifiers of data records according to those modifications have being transmitted and transmissions of those have being acknowledged during the incomplete synchronization session. It shall be noted that the information provided by local unique identifiers may not be sufficient and data base identifiers may have to be logged supplementary to the local unique identifiers. The combination of a local unique identifier and the associated data base identifier enables to determine (unambiguously) a corresponding data record referenced by the local unique identifier. The data base identifiers may be uniform resource locators (URI) as known in the art.

The stored LAST anchor, the stored NEXT anchor and the stored information relating to the incomplete synchronization session allow for restoring (re-establishing) the state of the previous incomplete synchronization session at the moment of interruption. This kind of reconstruction allows now for generating the messages referred to by the operations 206-208 shown in FIG. 2, illustrating a complete synchronization session, and missing in FIG. 3a, illustrating the same synchronization session but incomplete due to the interruption after the transmission of the synchronization message referred to by operation 204 (FIG. 2 and FIG. 3a).

Both the new client initialization message and the server initialization message referred to by operations 250 and 251 comprise also information necessary for establishing a synchronization session such as described with reference to operations 200 and 201 shown in FIG. 2.

Herein, it is assumed that the conditions for resuming the incomplete synchronization session are satisfied and the incomplete synchronization session has been reconstructed which enables the client 100 to carry on according to an embodiment of the method of the invention. The client synchronization message (package 3 type) referred to by operation 252 corresponds to the second client synchronization message referred to by operation 206 illustrated in FIG. 2. The client synchronization message comprises accordingly the last 5 of 10 modifications and the final instructor to indicate that this message is the last client synchronization message of the current synchronization session. Moreover, the message numbering, i.e. the message ID, is adapted to the current resuming synchronization session and therefore the client synchronization message in FIG. 3b has a message ID 2 subsequent to the previous message ID 1 of the initialization messages (referred to by operating 250 and operation 251). (It is important to note that the scope of the invention is intended to include other types of message numbering sessions.)

The server 110 responds to the client synchronization device by transmitting a server synchronization message (package 3 type) referred to by operation 253, corresponding to the second client synchronization message referred to by operation 206 illustrated in FIG. 2. This server synchronization message contains server modifications, client modification acknowledgements and status information of the analyze and synchronization processing. In accordance with the synchronization session depicted in FIG. 2, a single server synchronization message is sufficient for transmitting all identified the server modifications to the client such that this message additionally contains a final indicator. Both messages referred to by operations 252 and 253, respectively, contain the same message ID 2.

A client update status message (package 5 message type) referred to by an operation 254 is subsequently conveyed to the server 110 containing acknowledge information and synchronization status information due to the server modifications and if necessary map operations to the server 110 processing the data record map table assigning local unique identifiers and global unique identifiers. This client update status message corresponds also and accordingly to the client update status message referred to by the operation 208 described with reference to FIG. 2. Finally, although not depicted, the client update status message may be responded to by the server 110 with one or more map acknowledgement messages (package 6 message type).

Conclusively, the synchronization session and the communication connection through which the synchronization messages of this session are communicated are ended. In case no error is detected regarding the finalizing of the synchronization session and the communication connection the content NEXT anchor defined at the beginning of the synchronization session is assigned to the LAST anchor. This assignment is performed at the client 100 in an operation 260 and at the server 110 in an operation 261. Thus a following fast synchronization process is operable. It is noted that the defining of the NEXT anchor at the beginning of a synchronization session and the assigning of the NEXT anchor content to the LAST anchor after a proper finalization of the synchronization session prevent conflicts due to modification of data records on the client side or server side during the synchronization process. It may be additionally remarked that the content the depicted LAST anchors and NEXT anchors are just to enlighten their usage. For practical purposes the LAST anchors and the NEXT anchors are normally composed of or derived from a date value and a time value. This kind of composing may ensure to generate an unambiguous LAST and NEXT anchors, respectively.

It shall be further noted that modifications on data records after an incomplete synchronization session and before a resuming synchronization session are not taken into account during the resuming of the incomplete synchronization session. The resuming synchronization session establishes a state of the data records or data stores comprising them as if the incomplete synchronization session had been completed successfully. For that reason, the NEXT anchor representing a time stamp of a synchronization session is not updated during an initialization of a resuming synchronization session. The modifications occurred after an incomplete synchronization session can be synchronized by initiating a synchronization session after a successful resuming synchronization session, especially, a fast synchronization session can be initiated since the LAST anchor stored in the client 100 and the server 110 are updated and valid.

The acknowledgements that have been described in the context of the embodiments of the invention are to be interpreted to be any kind of responses to data received from the other end, including either a positive or a negative status of the synchronization of the data or the message. Typically, an acknowledgement would confirm the updating of a record, but an acknowledgement may also carry information of an unsuccessful operation, e.g., caused by a non-found record. Nevertheless, the handling of such errors is not an issue of the invention, but it is left up to the implementation to take care of the errors somehow. However, the occurrence of errors should not interfere with the resumption of the session, that is, the session should resume at the first unacknowledged data item irrespective of whether there have been errors in the data items before it.

FIG. 4 shows an excerpt of a XML-coded synchronization message in accordance with the synchronization process illustrated in FIG. 3b and according to an embodiment of the invention.

To insure an easy and interoperable implementation the industry-standard extensible markup language (XML) has been selected for specifying the synchronization messages that synchronize deices and applications (using either plain text or the wireless binary XML, binary technique employed by wireless application protocol). SyncML has been designed within the memory capacity of all common mobile devices both in static code and run-time execution space. Especially the binary coded extensible markup language (WBXML) is generally used for coding data to reduce the memory required to store messages and to reduce the resources needed to process and to convey this data.

The SyncML contains a set of well-defined messages (as shown above) being represented as XML documents or as multipurpose internet mail extension (MIME) entities. The representation specification specifies an XML document type description (DTD) which allow the representation of all information requires to perform synchronization including data, metadata and commands. The synchronization specification specifies the SyncML messages that conform to the DTD in order to allow a SyncML client and SyncML server to exchange additions, deletion, updates and other status information.

Other DTDs define the representation of information on the device (such as memory capacity) and of various types of meta-information (such as security credentials). The SyncML messages are conceptually based on a container concept as defined by the representation protocol. The each SyncML messages contains a SyncML header section and a SyncML body section. The SyncML header contains routing, session, authentication and message information, whereas the SyncML body section contains various well-defined synchronization data comprising status information and synchronization commands, each forming a sub-container.

The XML-based coding presented in FIG. 4 is an excerpt of an example plain text coding of a SyncML message in accordance with the client synchronization message referred to by operation 252 described with reference to FIG. 3b. The depicted XML-based coding contains the SyncML header section extending from line 3 to line 9 and the SyncML body section extending from line 10 to line 57.

Line 1 and line 2 contain common information on the XML-coding employed and the character encoding used for textual representation and the SyncML versioning information.

Each SyncML header contains a document type definition versioning information (VerDTD, line 4), a SyncML protocol versioning information (VerProto, line 5), a session identifier (SessionID, line 6) valid during one synchronization session to assign unambiguous all belonging synchronization messages thereto and a message identifier (MsgID, line 7) being increased such that each receiving synchronizing device receives subsequently synchronization messages having increasing message identifier numerals. The aforementioned elements of the SyncML header described as example, further optional and obligator elements are contained in the SyncML header.

The SyncML body contains several logical and independent subsection. A first status information subsection extends from line 11 to line 19. This first status information subsection relates to the reference addressing of the data records to be synchronized. In particular, the target reference (TargetRef, line 16) defines an international mobile equipment identifier (IMEI) for addressing the client, in this case a cellular communication device, whereas the source reference (SourceRef, line 17) defines a uniform resource identifier (URI) for addressing the server, in this case a networked server device accessible via HTTP (hypertext transfer protocol). Further addressing of individual data records and data storage is based on this reference address information. An arbitrary number of further status information subsection can also be comprised which is indicated by the second status information subsection extending from line 20 to line 22. For example acknowledgments are coded as status information.

The SyncML body section contains further a synchronization subsection which is further subdivided. As example, a client indicated modification concerning an addition of an contact is comprised. Line 26 contains the relative addressing path of the contacts database of the client whereas line 29 contains the relative addressing path of the contacts database of the server. The relative addressing paths are relative to the reference addressing described above. The Meta subsection extending from line 31 to line 36 contains additional meta-information about the data record (the contact) to be added to the contact database in the server. The subsection extending form line 37 to line 51 contains the adding instruction and the corresponding contact data content. In line 40 the data format of the content data in line 46 to line 48 is defined as x-vcard meta-type, whereas the corresponding data contents is contented in line 46 to line 48. A local unique identifier (LUID) used for uniquely referencing this contact in the client is comprised in line 44. An arbitrary number of further synchronization information subsection can further be comprised which is indicated by an further synchronization information subsection extending from line 52 to line 54.

The comprised Final instruction in line 56 indicates to the server that this example client synchronization message is the last message containing client modifications to be reported to the server for synchronizing.

The aforementioned method for resuming an preceding incomplete synchronization session according to an embodiment of the invention can be implemented in a client device and a server device in various ways. The following implementation is an example implementation being based on a SyncML standard implementation in which components have an enhanced functionality and capability in order to be additionally adapted to operate in accordance with an embodiment of the invention.

Figure 5:
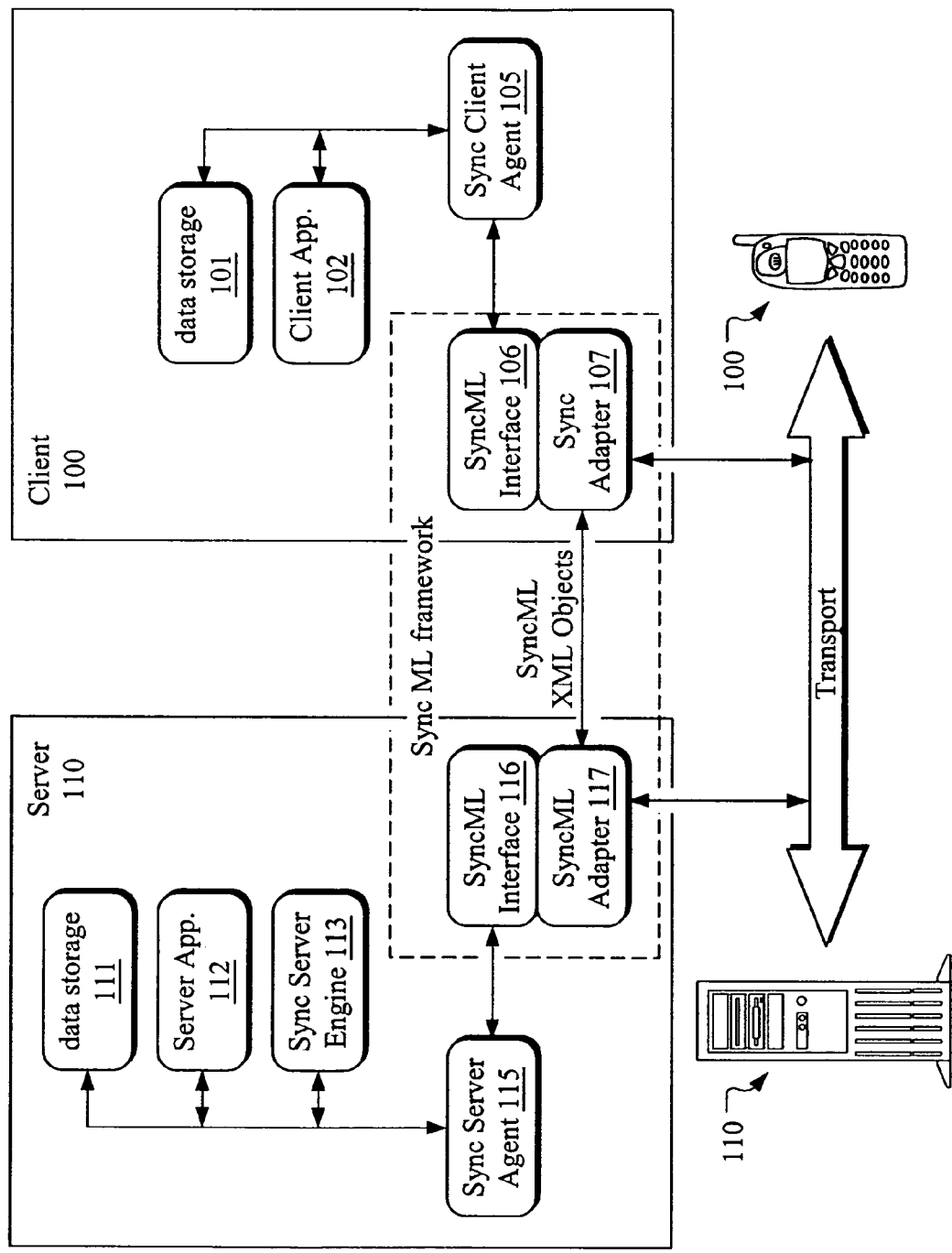
FIG. 5 shows a schematic block diagram illustrating components comprised by a synchronizing client device and a synchronizing server device according to an embodiment of the invention.

FIG. 5 shows a schematic block diagram illustrating components comprised by a synchronizing client device and a synchronizing server device according to an embodiment of the invention. FIG. 5 depicts a server 110 representing a network device offering a networked synchronization service. The networked synchronization service is represented by one or more server applications 112 and corresponding associated one or more data storage components 111. One or more server applications 112 provide the data synchronization with other applications being represented by one or more client applications 102 of the client 100 being a networked device. The one or more data storage components 111 host data records for handling by the one or more server applications 112 and hence for synchronization with the client, wherein the one or more data storage components 111 are for example one or several databases. The server 110 and the client 100 are connected over a communication network transport. A selection of suitable communication networks for connecting client 100 and server 110 has been presented and discussed with reference to FIG. 1.

The one or more server applications 112 uses a data synchronization protocol implemented as a synchronization server engine 113 being a component of or a process on the server 110. The data synchronization protocol is manifested on the communication network by client applications accessing the provided synchronization server network service and resources, respectively. A synchronization server agent 115 interfaces and manages the access and the communication of the synchronization server engine 113 to the network and enables communication of data synchronization operations with the client 100 and the one or more client applications 102, respectively. The synchronization agent 115 performs the interfacing and communicating by involving a synchronization interface 116 and a synchronization adapter 117, wherein the synchronization interface 116 is for example an application program interface (API) to the synchronization adapter 117. The synchronization adapter 117 is a component of or a process on the server 110, respectively, which communicates conceptually with a counterpart synchronization adapter 107 on the client side. The synchronization adapter 117 is above all responsible for establishing and maintaining network communication connections between server 110 and client 100, i.e. between the one or more server applications 112 providing data synchronization service and the one or more client applications 102 accessing and employing this data synchronization service.

On the client side, the one or more client applications 102 with one or more associated data storage components 101 storing data records to be accessible by the one or more client applications 102 use a synchronization client agent 105, the synchronization interface 106 and the synchronization adapter 107 to access the provided server synchronization service. The synchronization client agent 105 enables communication of data synchronization operations with the server 110 and the one or more server applications 112, respectively. The synchronization interface 106 represents for example analogously an application program interface (API) to the synchronization adapter 107.

The aforementioned method according to an embodiment of the invention is included in the above presented conceptual component framework of the server 110 and the client 100 for example by implementing one or several code sections in the synchronization client agent 115 and the synchronization server agent 105, wherein the one or several code sections comprise instructions which at execution of them perform an embodiment of the method for resuming an incomplete synchronization session. This way of implementation ensures that in case of an interruption of a synchronization session required information for resuming this interrupted synchronization session are logged or stored in the client 100 and the server 110.

Figure 6:
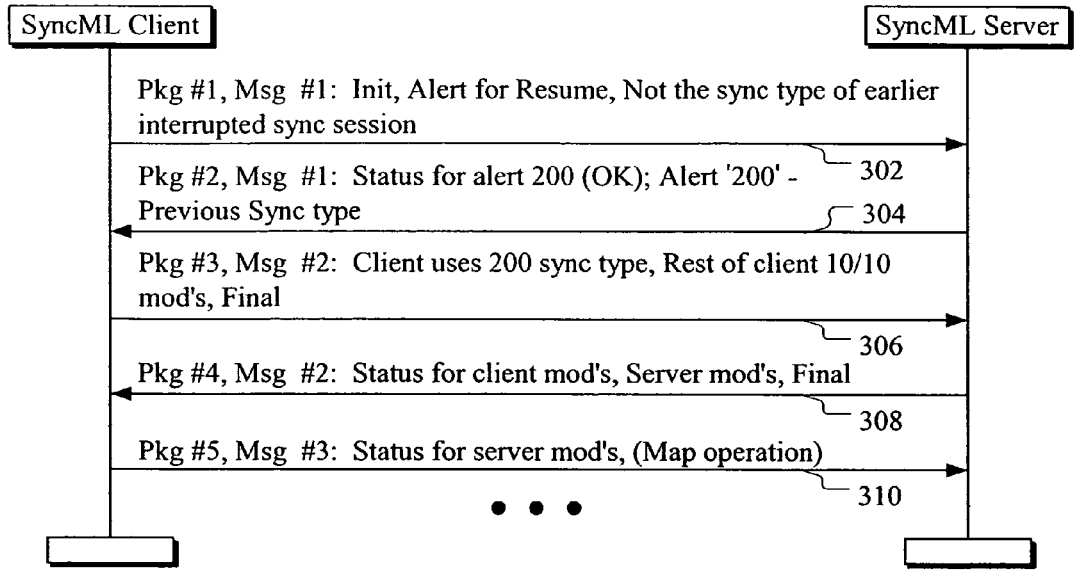
FIG. 6 shows a chronological sequence diagram of a synchronization process resuming the interrupted or stopped synchronization process of FIG. 3a according to an embodiment of the invention.
Figure 7:
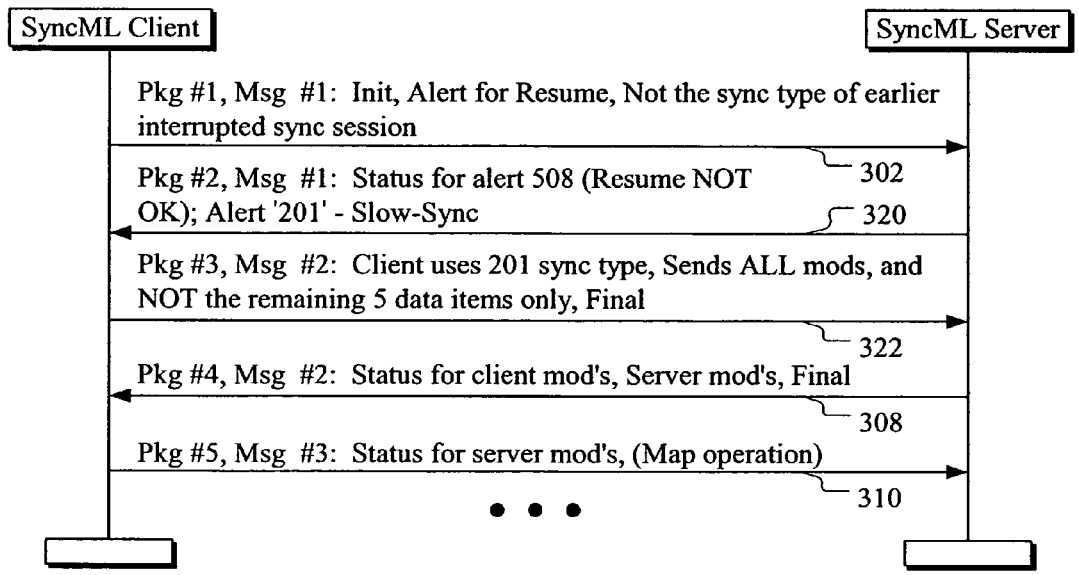
FIG. 7 shows a chronological sequence diagram of a synchronization process resuming the interrupted or stopped synchronization process of FIG. 3a according to an embodiment of the invention.
Figure 8:
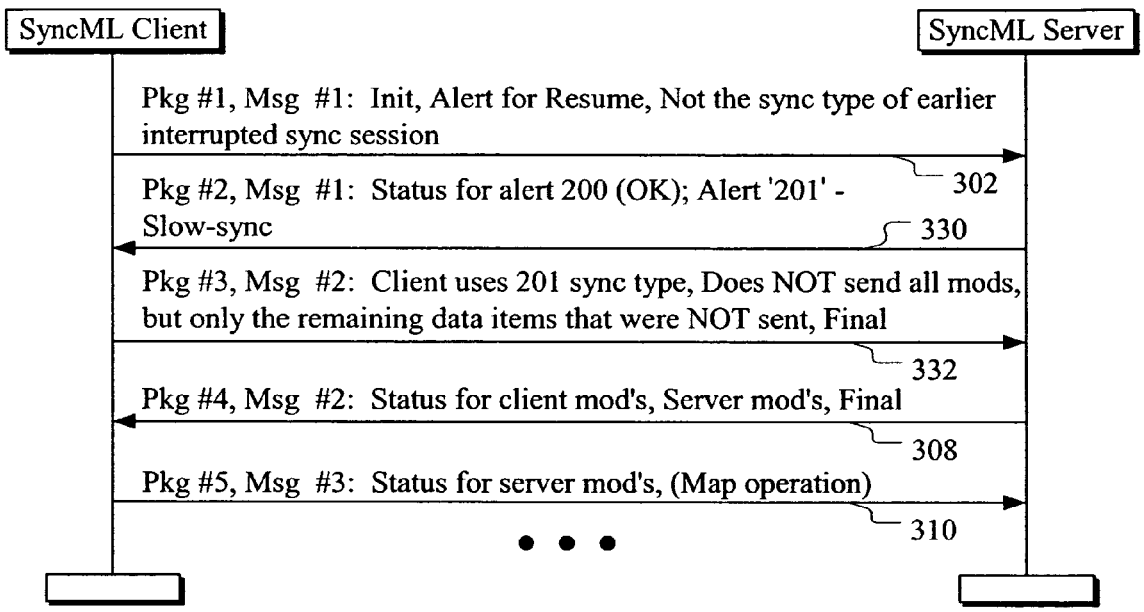
FIG. 8 shows a chronological sequence diagram of a synchronization process resuming the interrupted or stopped synchronization process of FIG. 3a according to an embodiment of the invention.

FIGS. 6-8 show an alternative embodiment of a method for resuming an interruption of a previous incomplete synchronization session related to an exchange of data between two devices according to the present invention. The method features the step of sending from the first device to the second device an alert for resuming signal containing information related to a request for the resumption of the previous incomplete synchronization session. As shown by way of example, the first device is the client, and the second device is the server. The method also features the step of sending from the second device to the first device a status for the alert signal indicative of information related to a sync type to be carried out. The information related to the status of the alert for resume signal may include information for accepting a resume session or overriding an earlier sync type of the previous incomplete synchronization session. If the earlier sync type is overriden, then the server commands the client to use a different sync type. 'Next' Anchor or Second update identifier may or may not be updated if the sync is interrupted. If the 'Next' anchor is updated after the interruption or, during the pause, this allows synchronizing the probably modified data items during the interruption thus allowing a better user-experience.

In FIG. 6, in step 302 the client sends the alert for resuming signal to the server. In step 304, the server replies with the status for alert signal back to the client containing an indication that the resumption of the session is O.K. In step 306, the client uses the previous interrupted sync session's sync type (e.g. fast or slow sync) and exchanges the rest of the client data. The synchronization session is complete with steps 308, 310, which are similar to steps 253, 254 discussed above in relation to FIG. 3b. In the aforementioned steps, both the resuming of the sync session and determining the sync type of previous interrupted sync session are included. Once the client sends the Resume Alert Code, the server agrees to resume the session and sends the appropriate alert code in the Alert element for the corresponding server-side datastore. The client must utilize this alert code to resume the sync session. This avoids storage of the sync type on client-side when the session gets interrupted.

Moreover, the scope of the invention is intended to include embodiments such that whenever an interruption occurs the client should send an alert for resume. This is applicable even if the client had received statuses for all items and has no more new or modified items to send in the resume session. In other words, if the transport was not disconnected elegantly or properly, then the client must request for resume instead of starting a new sync session. By doing so, this allows the server to send only the items that didn't get statuses.

FIG. 7 shows an overriding of the resume session by the server: In this case, the client's request for resume in step 302 is not acceptable by the server so the server can override the earlier sync type by sending, for example, a Status 508 (Refresh Sync) in step 320 or Status 509 (Another Sync type), or any other appropriate code for the same purpose, followed by the appropriate Sync type in Alert code 201 (slow-sync) or 2XX (for another sync-type), respectively. In step 322, the client uses the sync type specified by the server and sends all items, not only the remaining 5 data items. The scope of the invention is not intended to be limited to any specific status code numbers. Embodiments are envisioned using other status code numbers.

FIG. 8 shows a resuming of a slow-sync session. The client's request for resume by alerting the server and if the resume is acceptable by the server, a 200 Status (OK) is sent on the 'Alert for Resume' in step 330. The server, additionally, sends an alert 201 in the Alert element for the corresponding server-side datastores. This is similar to that discussed above in relation to FIG. 6, in relation to the determining of the sync type; however, it is important to note how to differentiate between the resuming of a slow-sync vs a forceful full slow-sync as an Alert 201 currently means a slow-sync and the client would start a full slow-sync. In order to differentiate between a resume of slow-sync and full slow-sync, the client can decide by looking at the status code send to 'Alert for Resume' in step 330. A 200 code would mean a resume slow-sync (the alternative is to have status codes for all different sync types, e.g., sending 220 instead of 200 to acknowledge that starting a resume session is OK), and a 508 code would mean full slow-sync. A full slow-sync can be achieved by sending 508 Status (refresh required) on the Alert for Resume followed by the Alert 201—refer to above. With this, the client will know that the previously interrupted slow-sync cannot be resumed, instead a full slow-sync must be used starting from the beginning. This wouldn't mean to start a new sync session, but may end up doing that, if needed.

According to another embodiment, it is possible to have an additional Alert code to indicate 'Alert for Pause': This will allow having an elegant way to interrupt the sync session. Resumption will be in accordance to the steps described earlier in this specification. This alert code will only help to achieve an elegant means to interrupt the sync session, usually initiated by the user. When such an alert is received by the second device, it may respond to the alert by a status code, whereby the first device can deduce whether it can also go to 'pause mode'. Naturally, the 'LAST' update identifier is not updated. Either the first or the second device can later send an indication to the other device to resume the paused synchronization session. For example, the first device may send a message containing an alert for resume signal to the second device, whereby the devices may continue the synchronization that was paused.

According to another embodiment, the present invention may also take the form of a software tool featuring program portions for carrying out the operations of the method described above, where the software tool is for being implemented in a computer program for being executed on a processing device, a terminal device, a communication terminal device or a network device.

According to another embodiment, the present invention may also take the form of a computer program comprising program code sections for carrying out the operations of the method described above, where said computer program is for being executed on a processing device, a terminal device, a communication terminal device or a network device.

According to another embodiment, the present invention may also take the form of a computer program product comprising program code sections stored on a computer readable medium for carrying out the method described above, where the computer program product is for being executed on a processing device, a terminal device, a communication terminal device or a network device.

It will be obvious for those skilled in the art that as the technology advances, the inventive concept can be implemented in a different and broader number of ways. The invention and its embodiments are thus not limited to the examples described above but may vary within the scope of the claims.

What is claimed is:

1. A method comprising:
   sending from a first device to a second device an alert for resuming signal containing information related to a request for the resumption of a previous incomplete synchronization session;
   receiving from the second device, at the first device, a status for the alert for resuming signal indicative of information related to a synchronization type to be carried out, wherein if said request is accepted, said synchronization type is a same synchronization type carried out during said previous incomplete synchronization session, wherein the alert and the status for the alert comprise numbered messages, such that the first device and the second device both have a consistent view of a message number for each numbered message;
   establishing a communication connection for synchronization of data between the first device and the second device each comprising a set of data to be synchronized;
   transmitting by the first device to the second device a first update identifier and a second update identifier, said first update identifier denoting a preceding complete synchronization event performed between said first device and said second device, a value of said first update identifier being stored at least in said first device, said second update identifier denoting a preceding incomplete synchronization event started between said first device and said second device, a value of said second update identifier stored at least in said first device;
   retrieving or forming an indication of data that has been successfully synchronized during said preceding incomplete synchronization event;
   using said indication, synchronizing data that has not been successfully synchronized during said preceding incomplete synchronization event; and
   at least in said first device, updating said value of said first update identifier with said value of said second update identifier, wherein the first update identifier and the second update identifier comprise numbered messages, such that the first device and the second device both have a consistent view of a message number for each numbered message.

2. A method according to claim 1, wherein the status for the alert signal includes at least one of:
   information for accepting a resume session; and
   information for overriding an earlier synchronization type of the previous incomplete synchronization session.

3. A method according to claim 1, wherein the information related to the request includes information logged in accordance with the interruption of the previous incomplete synchronization session and allowing for the resumption of the previous incomplete synchronization session.

4. A method according to claim 3, wherein the information logged in accordance with the interruption of the previous incomplete synchronization session being stored in each device of said first device and said second device.

5. A method according to claim 4, wherein the information logged in accordance with the interruption of the previous incomplete synchronization session includes a first update identifier containing information about a previous complete synchronization session having been performed between the two devices, and also includes a second update identifier containing information about the previous incomplete synchronization session.

6. A method according to claim 5, wherein the update identifier information logged in the second device is compared with the update identifier information logged in the first device and the previous incomplete synchronization session is resumed based on the comparison.

7. A method according to claim 6, wherein the method further comprises using different synchronization methods for resuming the previous incomplete synchronization session depending on the comparison.

8. A method according to claim 7, wherein the first update identifier is a LAST anchor and the second update identifier is a NEXT or PAUSE anchor.

9. A method according to claim 8, wherein the different synchronization methods include:
   if received and logged LAST anchor information match and received and logged NEXT anchor information match, a fast resumption synchronization is applied, said fast resumption synchronization comprises synchronizing only data records not synchronized in both previous complete synchronization session and previous incomplete synchronization session;
   if received and logged LAST anchor information match but received and logged NEXT anchor information do not match, a fast synchronization is applied, said fast synchronization comprises synchronizing only data records not synchronized in previous complete synchronization session, wherein the data records include data synchronized in previous incomplete synchronization;

if received and logged LAST anchor information do not match but received and logged NEXT anchor information match, a slow resumption synchronization is applied, said slow resumption synchronization comprises synchronizing data records not synchronized in previous incomplete synchronization session, wherein the data records include data synchronized in previous complete synchronization session; and if received and logged LAST anchor information do not match and received and logged LAST anchor information do not match, a complete slow synchronization is applied, said complete slow synchronization comprises synchronizing data records including data synchronized in previous complete synchronization session and data synchronized in previous incomplete synchronization session.

10. A method according to claim 6, wherein the information logged also includes a session identification of the previous incomplete synchronization session and a message identification of the last message properly transmitted and one or more unique record identifiers.

11. A method according to claim 6, wherein the method includes receiving, from the second device, a command, at the first device to resume the previous incomplete synchronization session based on the information logged.

12. Method according to claim 1, wherein the method further comprises:
transmitting additional information relating to said preceding incomplete synchronization event and comprising at least one information out of a group comprising information about said preceding incomplete synchronization, and information about data successfully synchronized in accordance with received synchronization related information.

13. Method according to claim 1, further comprising: in at least one of said first device and said second device:
in a first comparison, comparing a value of said first update identifier transmitted from the first device with a value of the second update identifier of the first device stored in the second device;
in a second comparison, comparing a value of said second update identifier transmitted from the first device with a value of the second update identifier of the first device stored in the second device;
carrying out at least one of the following options:
in case said second comparison yields a value of true, synchronizing data between said first device and said second device, said data comprising data that has not been exchanged during said preceding incomplete synchronization event;
in case said second comparison yields a value of false, synchronizing data between said first device and said second device, said data comprising at least data that has been synchronized during said preceding incomplete synchronization event;
in case said first comparison yields a value of false, synchronizing data between said first device and said second device, said data comprising data that has been synchronized during said preceding complete synchronization event; and
in case said first comparison yields a value of true:
synchronizing data between said first device and said second device, said data that has not been synchronized during said preceding complete synchronization event.

14. Method according to claim 1, wherein establishing a communication connection for synchronization further comprises:

transmitting an initial message instructing at least one of said first device and said second device to prepare for resuming said preceding incomplete synchronization.

15. Method according to claim 1, wherein said synchronization is based on a synchronization protocol in accordance with the SyncML standard, said first update identifier being a LAST synchronization anchor.

16. Method according to claim 15, wherein said second update identifier is at least one of a NEXT synchronization anchor and a PAUSE synchronization anchor.

17. Method according to claim 15, wherein said additional information relating to said preceding incomplete synchronization event comprises at least one information out of a group of a synchronization event session identifier (session ID), a synchronization message identifier (message ID), and one or more identifiers of acknowledged data and their respective data store.

18. Method according to claim 17, wherein said additional information has been stored at least in said first device before transmitting said first and second update identifiers.

19. Method according to claim 1, wherein data has been successfully synchronized if the acknowledgement for the data or the message containing the data has been successfully received, wherein the acknowledgement indicates either a positive or a negative status of the synchronization of the data or the message.

20. Computer program product comprising program code sections stored on a computer readable medium for carrying out the method of claim 1, wherein said computer program product is for being executed on a processing device, a terminal device, a communication terminal device or a network device.

21. A method according to claim 1, wherein the method comprises resuming the previous incomplete synchronization session related to an exchange of data between the first device and the second device by applying a type of synchronization selected from different synchronization types, including a fast resumption synchronization, a fast synchronization, a slow resumption synchronization or a complete slow synchronization, based at least partly on the information received.

22. Apparatus comprising:
means for sending from a first device to a second device an alert for resuming signal containing information related to a request for the resumption of the previous incomplete synchronization session;
means for receiving from the second device a status for the alert for resuming signal indicative of information related to a synchronization type to be carried out, wherein if said request is accepted, said synchronization type is a same synchronization type carried out during said previous incomplete synchronization session, wherein the alert and the status for the alert comprise numbered messages, such that the first device and the second device both have a consistent view of a message number for each numbered message;
means for establishing a communication connection for synchronization of data between the first device and the second device each comprising a set of data to be synchronized;
means for transmitting by the first device to the second device a first update identifier and a second update identifier, said first update identifier denoting a preceding complete synchronization event performed between said first device and said second device, a value of said first update identifier being stored at least in said first device, said second update identifier denoting a preceding incomplete synchronization event started between said first device and said second device, a value of said second update identifier stored at least in said first device;

means for retrieving or forming an indication of data that has been successfully synchronized during said preceding incomplete synchronization event;

means for, using said indication, synchronizing data that has not been successfully synchronized during said preceding incomplete synchronization event; and at least in said first device, means for updating said value of said first update identifier with said value of said second update identifier, wherein the first update identifier and the second update identifier comprise numbered messages, such that the first device and the second device both have a consistent view of a message number for each numbered message.

23. A system comprising:

a first device and a second device, wherein the first device comprises a communication interface and a synchronization agent module with computer program sections, the synchronization agent module with the computer code sections, with the communications interface, cause the first device to at least:

send to the second device an alert for resuming signal containing information related to a request for the resumption of a previous incomplete synchronization session related to an exchange of data between two devices; and receive from the second device a status for the alert for resuming signal indicative of information related to a synchronization type to be carried out, and wherein the second device comprises a communication interface and a synchronization agent module with computer program sections, the synchronization agent module and the computer code sections, with the communications interface, cause the second device to at least:

receive from the first device, the alert for resuming signal containing information related to the request for the resumption of the previous incomplete synchronization session related to exchange of data between two devices; and send to the first device, a status for the alert signal indicative of information related to the synchronization type to be carried out, wherein if said request is accepted, said synchronization type is a same synchronization type carried out during said previous incomplete synchronization session, wherein the alert and the status for the alert comprise numbered messages, such that the first device and the second device both have a consistent view of a message number for each numbered message;

wherein the first device further comprises a storage medium comprising a predefined set of data to be synchronized;

wherein the communication interface is further configured to establish a communication connection for synchronization of data to said second device for use in a network, for communicating a first update identifier and a second update identifier to said second device and for exchanging data with said second device;

a retrieving or a forming component for retrieving or forming an indication of data that has been synchronized during said preceding incomplete synchronization event, said indication having been stored in said first device;

wherein the synchronization agent module is further configured for synchronizing of data in accordance with said indication; and an updating component for updating contents of said first update identifier stored with contents of said second update identifier stored;

wherein the second device comprises:

a storage medium comprising a predefined set of data to be synchronized;

a communication interface for establishing a communication connection for synchronization of data to said first device for use in a network, for communicating a first update identifier and a second update identifier to said first device and for exchanging data with said first device, said second update identifier and said second update identifier being stored, a synchronizing component for synchronizing of data in accordance with said indication;

an updating component for updating contents of said first update identifier stored with contents of said second update identifier stored; and a component for comparing, in a first comparison, a value of said first update identifier transmitted from said first device with a value of said first update identifier stored in said second device, and for comparing, in a second comparison, a value of said second update identifier transmitted from said first device with a value of said second update identifier stored in the second device;

wherein said first update identifier denotes a preceding complete synchronization event having been performed with said second device, said first update identifier having been stored at least in one device, said second update identifier denoting a preceding incomplete synchronization event having been performed with said second device, said second update identifier having been stored at least in one device, wherein the first update identifier and the second update identifier comprise numbered messages, such that the first device and the second device both have a consistent view of a message number for each numbered message; and wherein said data comprises at least data that has not been synchronized during said preceding incomplete synchronization event in case that said comparing yields the same identifiers, said exchanged information being based on said indication.

24. A device comprising:

memory for storing data;

a communication interface; and a synchronization agent module with computer program sections, the memory, the synchronization agent module and the computer code sections, with the communications interface, cause the device to at least:

send to another device an alert for resuming signal containing information related to a request for the resumption of a previous incomplete synchronization session related to an exchange of data between two devices; and receive from the other device a status for the alert for resuming signal indicative of information related to a synchronization type to be carried out, wherein if said request is accepted, said synchronization type is a same synchronization type carried out during said previous incomplete synchronization session, wherein the alert and the status for the alert comprise numbered messages, such that the device and the another device both have a consistent view of a message number for each numbered message;

wherein the device further comprises a storage medium comprising predefined sets of data to be synchronized;

wherein the communication interface is further configured to establish a communication connection for synchronization of data to another device for use in a network, for communicating a first update identifier and a second update identifier with the another device and for exchanging data with said other network device, wherein said first update identifier denotes a preceding complete synchronization event having been performed with the another device, said first update identifier having been stored at least in said device, said second update identifier denoting a preceding incomplete synchronization event, said second update identifier having been stored at least in said device, wherein the first update identifier and the second update identifier comprise numbered messages, such that the device and the another device both have a consistent view of a message number for each numbered message, wherein said data comprises at least data that has not been synchronized during said preceding incomplete synchronization event; and wherein the synchronization agent module with computer code sections, is further configured to cause the device to:

retrieve or form an indication of data that has been synchronized during said preceding incomplete synchronization event, said indication having been stored in said network device;

synchronize data in accordance with said indication; and update contents of said first update identifier stored with contents of said second update identifier stored.

25. A device according to claim 24, wherein the information related to the request comprises information logged in accordance with the interruption of the previous incomplete synchronization session, said information comprises a first update identifier containing information about the previous complete synchronization session having been performed between the two devices, and also comprises a second update identifier containing information about the previous incomplete synchronization session.

26. A device according to claim 25, wherein, a value of said first update identifier transmitted from the device being compared, in a first comparison, with a value of the first update identifier stored in the other device;

a value of said second update identifier transmitted from the device being compared, in a second comparison, with a value of the second update identifier stored in the other device, based on said first comparison and said second comparison one of the following synchronizations is applied:

in case said first comparison yields a value of true and said second comparison yields a value of true, a fast resumption synchronization is applied, said fast resumption synchronization comprises synchronizing only data records not synchronized in both previous complete synchronization session and previous incomplete synchronization session;

in case said first comparison yields a value of false and said second comparison yields a value of true, a fast synchronization is applied, said fast synchronization comprises synchronizing only data records not synchronized in previous complete synchronization session, wherein the data records include data synchronized in previous incomplete synchronization;

in case said first comparison yields a value of false and said second comparison yields a value of true, a slow resumption synchronization is applied, said slow resumption synchronization comprises synchronizing data records not synchronized in previous incomplete synchronization session, wherein the data records include data synchronized in previous complete synchronization session; and in case said first comparison yields a value of false and said second comparison yields a value of false, a complete slow synchronization is applied, said complete slow synchronization comprises synchronizing data records including data synchronized in previous complete synchronization session and data synchronized in previous incomplete synchronization session.

27. A device according to claim 25, wherein the first update identifier is a LAST anchor and the second update identifier is a NEXT or PAUSE anchor.

28. A device according to claim 24, wherein said communication interface is configured to transmit supplementary additional information relating to said preceding incomplete synchronization event, wherein said additional information comprises at least one information out of a group comprising information about said preceding incomplete synchronization, information about a last successful exchange of synchronization related information and information about data successfully synchronized in accordance with received synchronization related information.

29. A device according to claim 24, wherein the synchronization agent is configured to:

compare, in a first comparison, a value of said first update identifier transmitted from the device with a value of the first update identifier of the device stored in the other device; and compare, in a second comparison, a value of said second update identifier transmitted from the device with a value of the second update identifier of the device stored in the other device, said synchronization agent being further configured to carry out at least one of the following options:

in case said second comparison yields a value of true, synchronize data between said device and said other device, said data comprising data that has not been exchanged during said preceding incomplete synchronization event;

in case said second comparison yields a value of false, synchronizing data between said device and said other device, said data comprising at least data that has been synchronized during said preceding incomplete synchronization event;

in case said first comparison yields a value of false, synchronizing data between said device and said other device, said data comprising data that has been synchronized during said preceding complete synchronization event; and in case said first comparison yields a value of true:

synchronizing data between said device and said other device, said data that has not been synchronized during said preceding complete synchronization event.

30. A method comprising:
receiving, at a second device from a first device, an alert for resuming signal containing information related to a request for the resumption of a previous incomplete synchronization session related to an exchange of data between two devices;
sending, from the second device to the first device in response to receiving the alert, a status for the alert for resuming signal indicative of information related to a synchronization type to be carried out, wherein if said request is accepted, said synchronization type is a same synchronization type carried out during said previous incomplete synchronization session, wherein the alert and the status for the alert comprise numbered messages, such that the first device and the second device both have a consistent view of a message number for each numbered message;
establishing a communication connection for synchronization of data between the second device and the first device each comprising a set of data to be synchronized;
transmitting by the second device to the first device a first update identifier and a second update identifier, said first update identifier denoting a preceding complete synchronization event performed between said second device and said first device, a value of said first update identifier being stored at least in said second device, said second update identifier denoting a preceding incomplete synchronization event started between said second device and said first device, a value of said second update identifier stored at least in said second device;
retrieving or forming an indication of data that has been successfully synchronized during said preceding incomplete synchronization event;
using said indication, synchronizing data that has not been successfully synchronized during said preceding incomplete synchronization event; and
at least in said second device, updating said value of said first update identifier with said value of said second update identifier, wherein the first update identifier and the second update identifier comprise numbered messages, such that the second device and the first device both have a consistent view of a message number for each numbered message.

31. A computer program, comprising program code sections for carrying out the operations of the method of claim 30, wherein said computer program is for being executed on a processing device, a terminal device, a communication terminal device or a network device.

32. A computer program product, said computer program product comprising a computer program according to claim 31 stored on a computer readable medium.

33. A device comprising:
memory for storing data;
a communication interface; and
a synchronization agent module with computer program sections,
the memory, the synchronization agent module and the computer code sections, with the communications interface, cause the device to at least:
receive from another device an alert for resuming signal containing information related to a request for the resumption of a previous incomplete synchronization session related to an exchange of data between two devices; and
send to the another device, in response to receiving the alert, a status for the alert for resuming signal indicative of information related to a synchronization type to be carried out, wherein if said request is accepted, said synchronization type is a same synchronization type carried out during said previous incomplete synchronization session, wherein the alert and the status for the alert comprise numbered messages, such that the device and the another device both have a consistent view of a message number for each numbered message;
wherein the memory for storing data further comprises a storage medium comprising predefined sets of data to be synchronized;
wherein the communication interface is further configured to establish a communication connection for synchronization of data to another device for use in a network, for communicating a first update identifier and a second update identifier with the another device and for exchanging data with said other network device,
wherein said first update identifier denotes a preceding complete synchronization event having been performed with the another device, said first update identifier having been stored at least in said device, said second update identifier denoting a preceding incomplete synchronization event, said second update identifier having been stored at least in said device, wherein the first update identifier and the second update identifier comprise numbered messages, such that the device and the another device both have a consistent view of a message number for each numbered message,
wherein said data comprises at least data that has not been synchronized during said preceding incomplete synchronization event; and
wherein the synchronization agent module with computer code sections is further configured to cause the device to:
retrieve or form an indication of data that has been synchronized during said preceding incomplete synchronization event, said indication having been stored in said network device;
synchronize data in accordance with said indication; and
update contents of said first update identifier stored with contents of said second update identifier stored.

34. A device according to claim 33, wherein the information related to the request comprises information logged in accordance with the interruption of the previous incomplete synchronization session, said information comprises a first update identifier containing information about a previous complete synchronization session having been performed between the two devices, and also comprises a second update identifier containing information about the previous incomplete synchronization session.

35. A device according to claim 34, wherein the memory, the synchronization agent module and the computer code sections, with the communications interface, cause the device to further:
compare, in a first comparison, a value of said first update identifier transmitted from the device with a value of the first update identifier stored in the other device; and
compare, in a second comparison, a value of said second update identifier transmitted from the device with a value of the second update identifier stored in the other device, wherein, in case said first comparison yields a value of true and said second comparison yields a value of true, a fast resumption synchronization is applied, said fast resumption synchronization comprises synchronizing only data records not synchronized in both previous complete synchronization session and previous incomplete synchronization session;

in case said first comparison yields a value of false and said second comparison yields a value of true, a fast synchronization is applied, said fast synchronization comprises synchronizing only data records not synchronized in previous complete synchronization session, wherein the data records include data synchronized in previous incomplete synchronization;

in case said first comparison yields a value of false and said second comparison yields a value of true, a slow resumption synchronization is applied, said slow resumption synchronization comprises synchronizing data records not synchronized in previous incomplete synchronization session, wherein the data records include data synchronized in previous complete synchronization session; and in case said first comparison yields a value of false and said second comparison yields a value of false, a complete slow synchronization is applied, said complete slow synchronization comprises synchronizing data records including data synchronized in previous complete synchronization session and data synchronized in previous incomplete synchronization session.

36. A device according to claim 34, wherein the first update identifier is a LAST anchor and the second update identifier is a NEXT or PAUSE anchor.

* * * * *